United States Patent [19]

Mark et al.

[11] 4,251,434

[45] Feb. 17, 1981

[54] FLAME RETARDANT POLYCARBONATE COMPOSITION

[75] Inventors: Victor Mark, Evansville; Edgar E. Bostick, Mt. Vernon, both of Ind.

[73] Assignee: General Electric Company, Pittsfield, Mass.

[21] Appl. No.: 6,472

[22] Filed: Jan. 25, 1979

[51] Int. Cl.³ .......................... C08K 5/42; C08K 5/45
[52] U.S. Cl. ..................... 260/45.8 RW; 260/45.7 S
[58] Field of Search ................. 260/45.7 S, 45.8RW

[56] References Cited

U.S. PATENT DOCUMENTS

| | | | |
|---|---|---|---|
| 3,951,910 | 4/1976 | Mark | 260/45.9 NC |
| 4,067,846 | 1/1978 | Mark | 260/45.9 KA |
| 4,104,246 | 8/1978 | Mark | 260/45.9 KA |
| 4,104,253 | 8/1978 | Mark | 260/45.9 NC |
| 4,110,299 | 8/1978 | Mark | 260/45.7 S |
| 4,110,307 | 8/1978 | Mark | 260/45.9 KA |

Primary Examiner—V. P. Hoke
Attorney, Agent, or Firm—William F. Mufatti

[57] ABSTRACT

An improved flame retardant polycarbonate composition of an aromatic carbonate polymer in admixture with an organic alkali metal salt or an organic alkaline earth metal salt which composition has in admixture therewith other organic alkali metal salt or organic alkaline earth metal salt such that the salt mixture contains at least two different cationic components.

6 Claims, No Drawings

FLAME RETARDANT POLYCARBONATE COMPOSITION

This invention is directed to an improved flame retardant polycarbonate composition comprising a mixture of an aromatic polycarbonate and an organic alkali metal salt or an organic alkaline earth metal salt, said mixture including an additional organic alkali metal salt or organic alkaline earth metal salt such that the salts in said mixture have different cationic components.

BACKGROUND OF THE INVENTION

The increasing concern for safety has resulted in a move towards providing safer materials for public and household use. One particular area of need is that of providing flame retardant products which will be used by a consumer. As a result, many products are now required to meet certain flame retardant criteria both by local and federal governments as well as by the manufacturers of such products. One particular set of conditions used as a standard for flame retardancy is set forth in Underwriters' Laboratories, Inc. Bulletin 94 which proscribes certain conditions by which materials are rated for self-extinguishing characteristics.

It is known that various flame retardant additives can be employed to render products self-extinguishing or flame retardant. Such flame retardant additives are typically employed in amounts of about 5–20 weight percent in order to be effective for their intended purpose. It is also known that the use of these flame retardants in such amounts can have a degrading effect upon the base product to be rendered flame retardant, resulting in the deterioration of valuable physical properties of the base product. This is particularly so when known flame retardant additives are employed with polycarbonate resins since many of these additives have a degrading effect upon the polymer.

DESCRIPTION OF THE INVENTION

It has now been found that the flame retardancy of aromatic polycarbonate compositions containing certain organic alkali metal salts or organic alkaline earth metal salts as additives can be improved by the co-addition of other organic alkali metal salt or organic alkaline earth metal salt additives such that the mixture or salt additives contains at least two different cationic components.

Stated another way, it has been found that certain flame retardant salts can be made more effective when the salts are a mixture of two or more salts that differ from each other in the nature of the cations, the salts in the mixture being selected from the group consisting of organic alkali metal salts or organic alkaline earth metal salts. It has been further discovered that the anionic portion of the salts in the mixture can also be different from each other as long as the cationic portion represents a mixture of at least two cations in the organic alkali metal salt or organic alkaline earth metal salt groups.

These two types of combinations can schematically be represented as follows:

(I) $A_1C_1$ plus $A_1C_2$; and (II) $A_1C_1$ plus $A_2C_2$ wherein $A_1$ and $A_2$ are two different anions, and $C_1$ and $C_2$ are two different cations. Note that while the anions in the mixture can be the same or different, the cations are always different. The same conditions apply regardless of the type of salt mixture; i.e., binary, ternary, quaternary, etc.

The combination of two or more organic salt additives not only results in improved flame retardancy but permits lower concentrations of each of the salts to be used than has been heretofore possible in individual formulations. Since the effect of the combined salts on flame retardancy performance is greater than the sum of two separate salts, a synergistic interaction is suggested. Thus, the flame retardancy of aromatic polycarbonate resins containing organic alkali metal salts and organic alkaline earth metal salts is significantly enhanced by the co-addition of other organic alkali metal and organic alkaline earth metal salts.

The organic alkali metal salts and alkaline earth metal salts of the invention are selected from the group consisting of:

alkali metal salt and alkaline earth metal salts of monomeric or polymeric aromatic sulfonic acid;

alkali metal salts and alkaline earth metal salts of monomeric or polymeric aromatic sulfone sulfonic acid;

alkali metal salts and alkaline earth metal salts of unsubstituted sulfonic acids of aromatic ketones;

alkali metal salts and alkaline earth metal salts of sulfonic acids of aromatic sulfides;

alkali metal salts and alkaline earth metal salts of either monomeric or polymeric aromatic ether sulfonic acids;

alkali metal salts and alkaline earth metal salts of either monomeric or polymeric aromatic amide sulfonic acids;

alkali metal and alkaline earth metal salts of either halogenated monomeric and polymeric unsubstituted or substituted aromatic sulfonic acids;

alkali metal and alkaline earth metal salts of halogenated, substituted and unsubstituted sulfonic acids of heterocyclic compounds wherein the heterocyclic compound is selected from the group consisting of five and six membered heterocyclic nuclei containing a hetero atom selected from the group consisting of nitrogen, oxygen and sulfur;

alkali metal and alkaline earth metal salts of halocycloaliphatic aromatic sulfonic acids;

alkali metal and alkaline earth metal salts of halogenated methanesulfonic acids;

alkali metal and alkaline earth metal salts of halogenated non-aromatic carboxylic acids.

The organic alkali metal and organic alkaline earth metal salts employed herein are fully described as follows:

U.S. Pat. No. 3,933,734 discloses a flame retardant polycarbonate composition comprising a mixture of an aromatic polycarbonate and an additive which can be the metal salt of either the monomeric or polymeric aromatic sulfonic acids or mixtures thereof.

U.S. Pat. No. 3,948,851 discloses a flame retardant polycarbonate composition comprising a mixture of an aromatic polycarbonate and an additive which can be the metal salt of either the monomeric or polymeric aromatic sulfone sulfonic acids or mixtures thereof.

U.S. Pat. No. 3,926,908 discloses a flame retardant polycarbonate composition comprising a mixture of an aromatic polycarbonate and an additive which can be the metal salt of substituted and unsubstituted sulfonic acids of aromatic ketones and mixtures thereof.

U.S. Pat. No. 3,909,490 discloses a flame retardant polycarbonate composition comprising a mixture of an aromatic polycarbonate and an additive which can be the metal salt of substituted and unsubstituted sulfonic acids of aromatic sulfides and mixtures thereof.

U.S. Pat. No. 3,953,396 discloses a flame retardant polycarbonate composition comprising a mixture of an aromatic polycarbonate and an additive which can be the metal salt of either the substituted or unsubstituted sulfonic acid of an aromatic ether.

U.S. Pat. No. 3,951,910 discloses a flame retardant polycarbonate composition comprising a mixture of an aromatic polycarbonate and a metal salt of either the monomeric or polymeric substituted and unsubstituted aromatic amide sulfonic acid or mixtures thereof.

U.S. Pat. No. 3,940,366 discloses a flame retardant polycarbonate composition comprising a mixture of an aromatic polycarbonate and an additive which can be the metal salt of either the monomeric or polymeric substituted aromatic sulfonic acid or mixtures thereof.

U.S. Pat. No. 3,919,167 discloses a flame retardant polycarbonate composition comprising a mixture of an aromatic polycarbonate and an additive which can be the metal salt of substituted and unsubstituted sulfonic acid of heterocyclic compounds and mixtures thereof.

U.S. Pat. No. 3,917,559 discloses a flame retardant polycarbonate composition comprising a mixture of an aromatic polycarbonate and an additive which can be the metal salt of halocycloaliphatic aromatic sulfonic acid and mixtures thereof.

U.S. Pat. No. 3,931,100 discloses a flame retardant polycarbonate composition comprising a mixture of an aromatic polycarbonate and an additive which can be the metal salts of aliphatic and olefinic sulfonic acids and mixtures thereof.

U.S. Pat. No. 3,978,024 discloses a flame retardant polycarbonate composition comprising a mixture of an aromatic polycarbonate and an additive which can be the metal salts of either monomeric or polymeric phenol ester sulfonic acids or mixtures thereof.

U.S. Pat. No. 4,069,201 discloses a flame retardant polycarbonate composition comprising a mixture of an aromatic polycarbonate and an additive which can be the metal salts of unsubstituted or halogenated oxocarbon acids or mixtures thereof.

U.S. Pat. No. 3,953,399 discloses a flame retardant polycarbonate composition comprising a mixture of an aromatic polycarbonate and an additive which can be the metal salts of sulfonic acids of monomeric and polymeric aromatic carboxylic acids and esters or mixtures thereof.

U.S. Pat. No. 4,066,618 discloses a flame retardant polycarbonate composition comprising a mixture of an aromatic polycarbonate and an additive which can be the metal salt of a halogenated nonaromatic carboxylic acid or mixtures thereof.

The foregoing patents are incorporated herein by reference and the metal salts of any of these patents, as well as mixtures thereof can be used in the practice of this invention.

These organic alkali metal salts and alkaline earth metal salts are used in amounts of from 0.01 to about 5.0 parts per hundred parts (pph) of the aromatic polycarbonate.

The preferred organic alkali metal and alkaline earth metal salts include sodium benzenesulfonate; potassium benzenesulfonate; sodium naphthalene-1-sulfonate; sodium diphenylether-4-sulfonate; sodium diphenylsulfone-3-sulfonate; potassium naphthalene-2-sulfonate; sodium toluene-4-sulfonate; dipotassium diphenylsulfone-3, 3'-disulfonate; calcium biphenyl-4-sulfonate; polysodium polystyrene sulfonate; sodium diphenylsulfide-4-sulfonate; barium 2,5-dichlorobenzene sulfonate; sodium pentachlorobenzene sulfonate; potassium 2,4,5-trichlorobenzene sulfonate; sodium 2,4,5-trichlorobenzene sulfonate; potassium 4-bromobenzene sulfonate; potassium trifluoromethane sulfonate; sodium 5-chlorothiophene-2-sulfonate; sodium 2,3,4,5,6-pentachlorodiphenyl-sulfide-4'-sulfonate; sodium p-iodobenzene sulfonate; polypotassium(4-chlorostyrene)-poly-3-sulfonate.

In the practice of this invention, the aromatic polycarbonates that can be employed herein are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl)propane), bis(4-hydroxyphenyl) methane, 2,2-bis(4-hydroxy-3-methylphenyl) propane, 4,4-bis(4-hydroxyphenol) heptane, 2,2-(3,5,3',5'-tetrachloro-4,4-dihydroxydiphenyl)-propane, 2,2-(3,5,3',5'-tetrabromo-4,4'-dihydroxydiphenyl) propane, 2,2-bis(3,3'-dichloro-4,4'-dihydroxyphenyl)propane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also, blends of any of the above materials can be employed to provide the aromatic polycarbonate.

The carbonate precursor can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate, di-(halophenyl)carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates which can be used include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention can be prepared by employing a molecular weight regulator, an acid acceptor and a catalyst. The molecular weight regulators which can be employed include monohydric phenols such as phenol, chroman-I, para-tertiarybutylphenol, parabromophenol, primary and secondary amines, etc. Preferably, phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The catalysts which can be employed are any of the catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of the polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid or their haloformyl derivatives.

Also included herein are blends of a linear polycarbonate and a branched polycarbonate.

PREFERRED EMBODIMENT OF THE INVENTION

The following examples are presented to more fully and clearly illustrate the invention. Although the examples set forth the best mode presently known to practice the invention they are intended to be and should be considered as illustrative rather than limiting the invention. In the examples, all parts and percentages are by weight unless otherwise specified.

EXAMPLE I

One hundred (100) parts of an aromatic polycarbonate, prepared by reacting 2,2-bis(4-hydroxyphenyl)propane and phosgene in the presence of an acid acceptor and a molecular weight regulator and having an intrinsic viscosity of 0.57 was mixed with the amounts of the additives listed in the Table by tumbling the ingredients together in a laboratory tumbler. The resulting mixture was then fed to an extruder, which extruder was operated at about 550° C., and the extrudate was comminuted into pellets.

The pellets were then injection molded at about 600° C. into test bars of about 5 in. by ½ in. by about 1/16150 in. thick and into test squares of about 2 in. by 2 in. by about ⅛ in. thick. The test bars (5 for each additive listed in the Table) were subjected to the test procedure set forth in Underwriters' Laboratories, Inc. Bulletin UL-94, Burning Test for Classifying Materials. In accordance with this test procedure, materials so investigated are rated either V-0, V-I or V-II based on the results of 5 specimens. The criteria for each V (for vertical) rating per UL-94 is briefly as follows:

"V-0": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ¼" of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the invention, as "burns". Further, UL-94 requires that all test bars in each test group must meet the V-type rating to achieve the particular classification. Otherwise, the 5 bars receive the rating of the worst single bar. For example, if one bar is classified as V-II and the other four (4) are classified as V-0, then the rating for all 5 bars is V-II.

The results of employing the different additives of the invention are shown in the following Table wherein the invention additives are identified as Examples 1-18 and the "Control" is the aromatic polycarbonate as prepared above without any additive.

TABLE

| Example | Organic Salt Additive I | Amount (pph) | Organic Salt Additive II | Amount (pph) | Flame Out Time (Sec) | No. of Drips Per Five Test Bars | UL-94 Rating |
| --- | --- | --- | --- | --- | --- | --- | --- |
| Control | — | — | — | — | 26.0 | 13 | Burning |
| 1 | Sodium benzenesulfonate | 0.2 | — | — | 4.2 | 4 | V-II |
| 2 | — | — | Potassium benzenesulfonate | 0.2 | 6.0 | 5 | V-II |
| 3 | Sodium benzenesulfonate | 0.1 | Potassium benzenesulfonate | 0.1 | 5.2 | 0 | V-I |
| 4 | Sodium 2,5-dichlorobenzenesulfonate | 1.0 | — | — | 1.9 | 5 | V-II |
| 5 | — | — | Calcium 2,5-dichlorobenzenesulfonate | 1.0 | 2.7 | 1 | V-II |
| 6 | Sodium 2,5-dichlorobenzenesulfonate | 0.8 | Calcium 2,5-dichlorobenzenesulfonate | 0.2 | 2.3 | 0 | V-0 |

TABLE-continued

| Example | Organic Salt Additive I | Amount (pph) | Organic Salt Additive II | Amount (pph) | Flame Out Time (Sec) | No. of Drips Per Five Test Bars | UL-94 Rating |
|---|---|---|---|---|---|---|---|
| 7 | Sodium 2-chloro-5-nitrobenzenesulfonate | 1.0 | — | — | 4.5 | 6 | V-II |
| 8 | — | — | Calcium 2-chloro-5-nitrobenzenesulfonate | 1.0 | 5.1 | 3 | V-II |
| 9 | Sodium 2-chloro-5-nitrobenzenesulfonate | 0.4 | Calcium 2-chloro-5-nitrobenzenesulfonate | 0.6 | 4.4 | 0 | V-0 |
| 10 | Potassium benzenesulfonate | 0.2 | — | — | 6.0 | 5 | V-II |
| 11 | — | — | Sodium 2,4,5-trichlorobenzene sulfonate | 0.2 | 3.4 | 5 | V-II |
| 12 | Potassium benzenesulfonate | 0.1 | Sodium 2,4,5-trichlorobenzene sulfonate | 0.1 | 4.8 | 0 | V-0 |
| 13 | Sodium benzenesulfonate | 0.2 | — | — | 4.2 | 4 | V-II |
| 14 | — | — | Barium pentachlorobenzene sulfonate | 0.2 | 3.3 | 3 | V-II |
| 15 | Sodium benzenesulfonate | 0.1 | Barium pentachlorobenzene sulfonate | 0.1 | 2.2 | 0 | V-0 |
| 16 | Sodium 2,5-dichlorothiophene-3-sulfonate | 1.0 | — | — | 4.2 | 1 | V-II |
| 17 | — | — | Calcium 2,5-dichlorothiophene-3-sulfonate | 1.0 | 4.9 | 6 | V-II |
| 18 | Sodium 2,5-dichlorothiophene-3-sulfonate | 0.6 | Calcium 2,5-dichlorothiophene-3-sulfonate | 0.4 | 4.8 | 0 | V-0 |

From the results shown in the foregoing Table it can be seen that when the mixture of salts were employed containing at least two different cationic components, flame-out time was significantly reduced, there was no dripping and the UL-94 rating was V-0 (Examples 6, 9, 12, 15 and 18). Further, these results were obtained even when the salts comprised a mixture of anionic and cationic components as shown in Examples 12 and 15. It is also interesting to note that even when the salt mixture of the invention was employed at a concentration as low as 0.2 pph, as in Example 3, acceptable results were obtained as this sample did not drip; its V-I rating being the result of the flame-out time exceeding the 5-second limitation by only 0.2 second.

What is claimed is:

1. A flame-retardant polycarbonate composition comprising a mixture of an aromatic polycarbonate resin and an organic alkali metal salt or organic alkaline earth metal salt, said salts being co-mixed with another organic alkali metal salt or organic alkaline earth metal salt with the proviso that said metal salt mixture contains metal salts having the same organic moiety with at least two different cationic components, said salts being selected from the group consisting of:
   alkali metal salts and alkaline earth metal salts of monomeric aromatic sulfonic acids;
   alkali metal and alkaline earth metal salts of monomeric halogenated aromatic sulfonic acids;
   alkali metal and alkaline earth metal salts of sulfonic acids of heterocyclic compounds wherein the heterocyclic compound is selected from the group consisting of a five membered heterocyclic nuclei containing a sulfur hetero atom.

2. The composition of claim 1 wherein the metal salt mixture is present in an amount of about 0.01–5.0 parts per hundred parts of said aromatic polycarbonate resin.

3. The composition of claim 1 wherein the metal salt mixture comprises sodium and potassium cations.

4. The composition of claim 1 wherein the metal salt mixture comprises sodium and calcium cations.

5. The composition of claim 1 wherein the metal salt mixture is derived from benzenesulfonic acid.

6. The composition of claim 1 wherein the metal salt mixture is derived from trichlorobenzenesulfonic acid.

* * * * *

UNITED STATES PATENT AND TRADEMARK OFFICE
CERTIFICATE OF CORRECTION

PATENT NO. : 4,251,434
DATED : 2/17/81
INVENTOR(S) : Victor Mark, et al

It is certified that error appears in the above-identified patent and that said Letters Patent are hereby corrected as shown below:

Column 4, line 22, "(4-hydroxyphenol)" should be --(4-hydroxyphenyl)--.

Column 6, line 14, "by about 1/16 150" should be --by about 1/16-1/8--.

Signed and Sealed this

Twenty-second Day of September 1981

[SEAL]

Attest:

Attesting Officer

GERALD J. MOSSINGHOFF
Commissioner of Patents and Trademarks